United States Patent [19]

Wolin

[11] Patent Number: 4,567,474
[45] Date of Patent: Jan. 28, 1986

[54] FREEZER ACCIDENTAL DEFROST WARNING DEVICE

[75] Inventor: Dale Wolin, Eagle, Id.

[73] Assignee: Temco Products Corporation, Boise, Id.

[21] Appl. No.: 501,757

[22] Filed: Jun. 6, 1983

[51] Int. Cl.[4] .............................................. G08B 21/00
[52] U.S. Cl. ..................... 340/584; 340/585; 340/586; 340/599; 340/663; 340/687
[58] Field of Search ............................ 340/584–586, 340/661, 599, 571, 52 F, 568, 663, 687

[56] References Cited

U.S. PATENT DOCUMENTS

| | | | |
|---|---|---|---|
| 2,945,218 | 7/1960 | Markow | 340/599 X |
| 3,343,151 | 9/1967 | Brown et al. | 340/585 X |
| 3,419,214 | 12/1968 | Evalds | 340/599 X |
| 3,445,835 | 5/1969 | Fudaley | 340/568 X |
| 3,594,752 | 7/1971 | Alton | 340/585 |
| 3,753,259 | 8/1973 | Donovan | 340/585 X |
| 3,781,837 | 12/1973 | Anderson et al. | 340/599 X |
| 3,931,620 | 1/1976 | Wellman, Jr. et al. | 340/599 |
| 4,024,495 | 5/1977 | O'Brien | 340/585 X |
| 4,169,357 | 10/1979 | Kelley | 340/663 X |
| 4,240,077 | 12/1980 | Hughes et al. | 340/661 X |
| 4,284,983 | 8/1981 | Lent | 340/571 X |
| 4,301,661 | 11/1981 | Krewson, Jr. | 62/130 |
| 4,309,585 | 1/1982 | Dol et al. | 340/687 X |
| 4,316,185 | 2/1982 | Watrous et al. | 340/661 X |
| 4,353,055 | 10/1982 | Kawakatsu et al. | 340/52 F X |
| 4,354,173 | 10/1982 | Kuhn et al. | 340/52 F |
| 4,399,429 | 8/1983 | Laporte | 340/52 F X |
| 4,407,141 | 10/1983 | Paddock | 340/585 X |
| 4,476,461 | 10/1984 | Carubia | 340/52 F X |
| 4,478,521 | 10/1984 | Evans et al. | 340/52 F X |
| 4,497,057 | 1/1985 | Kato et al. | 340/52 F X |

FOREIGN PATENT DOCUMENTS 1084141  8/1980  Canada ................................ 340/585

OTHER PUBLICATIONS

"Temperature Monitor", Elektor, vol. 1, No. 5, p. 742, Jul.-Aug. 1975.
Prior Public Use Freezer High-Temperature Protection Device, Oct. 1981.

Primary Examiner—James L. Rowland
Assistant Examiner—Thomas J. Mullen, Jr.
Attorney, Agent, or Firm—Cushman, Darby & Cushman

[57] ABSTRACT

A device simply and effectively senses undesirably high temperatures in a refrigerated volume with an accuracy of about 3 percent, and activates an indicator in response to the sensing. A temperature probe is disposed in a freezer, refrigerator, or cooler volume, the probe including a negative temperature coefficient thermistor forming part of a voltage measurement bridge. The resistors of the voltage measurement bridge are all accurate to one percent, and are connected up to a voltage comparator of an integrated circuit. A 9 volt battery powers the device. The device also includes a low battery voltage sensor for activating the indicator when the battery voltage drops below about 8.2 volts, and a sensor for detecting when the probe is damaged or disconnected. The probe detection circuit includes a Darlington transistor, and resistor, the Darlington transistor being connected through a diode to the indicator. The indicator may include a piezo electric horn driven by a horn oscillator circuit.

10 Claims, 2 Drawing Figures

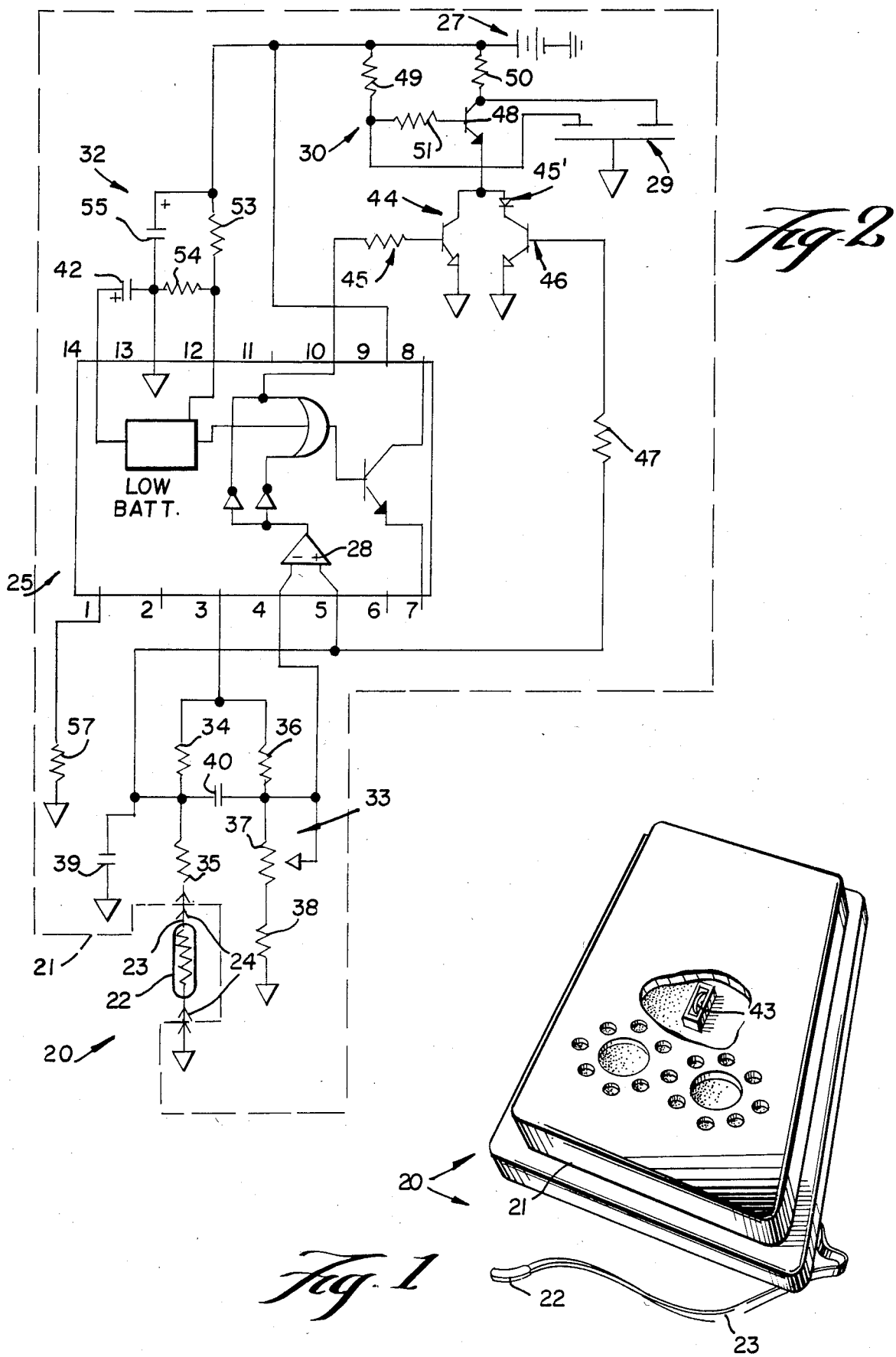

FREEZER ACCIDENTAL DEFROST WARNING DEVICE

BACKGROUND AND SUMMARY OF THE INVENTION

The invention relates to a temperature sensing device that is portable and can accurately sense temperature conditions and actuate an indicator in response to such sensing. The invention is particularly useful with appliances such as freezers, refrigerators, coolers, and the like. Should the temperature in the storage area of such appliances rise above a certain value, damage to products stored therein can result.

The device according to the present invention is capable of accurately sensing when the temperature in a volume to which the device of the invention is operatively connected rises above a predetermined value, the device according to the invention being accurate to 3 percent in sensing the relevant temperature. Because of its portability, the device according to the invention is extremely versatile and can be quickly and easily disposed in operative association with the appliance to be protected. Preferably the device provides an audible alarm which can be easily heard.

The device according to the present invention includes a voltage measurement bridge which in a simple and inexpensive manner accurately facilitates sensing of the temperature in the volume occupied by a temperature probe operatively associated with the device, and actuates an indicator in response thereto. The temperature probe comprises a component part of the voltage measurement bridge, and one of the resistors in the voltage measurement bridge is a variable resistor which is readily adjustable to set the alarm-initiating temperature. In practice, the variable resistor is adjustable so that the relevant temperature may be adjusted from about zero to about 50° F. This also facilitates versatility of the device, providing appropriate protection for freezers, refrigerators, beverage coolers, vegetable storage areas, and the like.

The device according to the present invention includes circuitry means for detecting when the probe is not operatively connected to the device, for whatever reason, such as when the probe is damaged, severed from the main unit, or is simply pulled out of the protected appliance. The missing probe detection circuitry means is simple and effective, eliminating hysteresis feedback, and providing a minimum number of component parts.

It is the primary object of the present invention to provide a simple, effective, efficient, and versatile device for sensing temperature conditions above a predetermined adjustable value. This and other objects of the invention will become clear from an inspection of the detailed description of the invention, and from the appended claims.

BRIEF DESCRIPTION OF THE DRAWINGS

FIG. 1 is a perspective view, with a portion cut away for clarity, of an exemplary temperature sensing device according to the present invention; and FIG. 2 is a circuitry schematic of the exemplary device of FIG. 1.

DETAILED DESCRIPTION OF THE DRAWINGS

An exemplary device according to the present invention is shown generally by reference numeral 20 in the drawings. The device preferably comprises a casing 21 and a temperature probe 22, electrical wires 23 operatively connecting the temperature probe 22 to the casing 21, with a releasable connector 24 (see FIG. 2) being provided therebetween. The probe 22 comprises a negative temperature co-efficient thermistor.

The basic circuitry component of the device 20 comprises element 25, which preferably consists of a National Semiconductor LM 1801 smoke detector integrated circuit. A battery 27, such as a conventional 9 volt battery, provides the power source for the circuitry. The integrated circuit 25 comprises means for detecting when the voltage output from battery 27 is low (and thus the battery needs replacement), and means for generating an output signal when an input comparator detects an abnormal input condition. The input comparator comprises voltage comparator 28 of the integrated circuit 25.

The output signal from the integrated circuit 25 is operatively connected to an indicator 29. While the indicator can be any desired indicator device that provides a sufficient indicator output, preferably the device 29 comprises an audible indicator, particularly a piezo electric horn. The horn 29 is driven by a horn oscillator circuit shown generally by reference numeral 30.

A voltage divider, shown generally by reference numeral 32, is operatively connected between the integrated circuit 25 and the battery 27. The components of the voltage divider 32 are chosen so that when the battery 27 voltage falls below about 8.2 v. nominal, the horn 29 will be activated.

The input to the voltage comparator 28 includes the probe 22, which is part of a voltage measurement bridge, shown generally by reference numeral 33 in FIG. 2. The voltage measurement bridge 33 comprises adjustable voltage measuring means for accurately determining a temperature within 3 percent of the temperature setting.

The voltage measurement bridge 33, in addition to the probe thermistor 22, comprises a first resistor 34, a second resistor 35, a third resistor 36, a variable resistor 37, and a fourth resistor 38. All resistors are chosen so that they are accurate to one percent. The provision of the voltage measurement bridge 33 as illustrated in FIG. 2 minimizes measurement error due to component tolerances. Typical values for the resistors are, resistor 34, 3.9M; 35, 178K; 36, 5.11M; 37, 500K; and 38, 267K. Note that resistors 34 and 35; and temperature probe 22, form the variable side of the voltage measurement bridge, while resistors 36–38 form the reference side thereof.

In addition the voltage measurement bridge 33 includes low and high pass filters provided by the capacitors 39 and 40. Low pass filter capacitor 39 preferably is a 0.01 microfarad capacitor, and keeps stray current spikes generated in the probe lead wire 23 from falsely triggering the comparator 28. High pass filter capacitor 40 also is preferably a 0.01 microfarad capacitor, and it maintains the potential across pins 4 and 5 of the integrated circuit 25 the same if any spikes are generated that capacitor 42 cannot react to quickly enough due to capacitor 42's internal impedance.

The effective resistance of the variable resistor 37 is changed by moving a readily accessible actuator within the casing 21. Such an actuator, in the form of a wheel 43, is illustrated schematically in FIG. 1. Merely by removing the cover of the casing 21 one can gain ready access to the wheel 43, and it is a simple matter to rotate it to select the desired setting. Indicia (not shown) are provided associated with the wheel 43 so that the temperature at which the horn 29 will be actuated can be readily determined. It is particularly desirable that the indicia indicate markings between about zero and about 50° F., which is the operative range of the voltage measurement bridge 33 specifically described above.

The output of pin 10 of integrated circuit 25 is operatively connected to transistor 44 through current limiting resistor 45 (e.g. 5.1K). Transistor 44 is the driver for the horn oscillator circuit 30. Diode 45' prevents the voltage at the collector of transistor 44 from affecting the measurement bridge 33 through the NPN Darlington transistor 46 base/collector junction when transistor 44 is "on" (i.e. eliminates hysterisis feedback). Resistors 34 through 36 and 38 are chosen to keep the normal voltage swings at pins 4 and 5 of the integrated circuit 25 between 0.26 and 1.05 volts. This keeps the missing probe circuit, defined by transistor 46 and resistor 47 (e.g. 180K), from turning "on".

The horn oscillator circuit 30 is a modified Hartly oscillator using the piezo element of the horn 29 as the feedback loop. The oscillator circuit is composed of transistor 48, and resistors 49 (e.g. 180K), 50 (e.g. 510 ohms), and 51 (e.g. 5.1K).

The voltage divider 32 includes resistors 53 (e.g. 2.7M), and 54 (e.g. 7.5M), with capacitor 42 operatively connected thereto and generating a time constant inside integrated circuit 25 of nominally 30 seconds. Capacitor 55 (e.g. 10 microfarads) is operatively connected to the voltage divider 32, and comprises a supply filter capacitor to keep from loading the relatively high impedance 9 volt battery (or batteries) 27, to thereby extend battery life when the horn 29 is on. When the horn 29 is off, that entire circuit draws approximately 9 microamps, and filter 55 is not utilized.

Resistor 57, connected to the bias pin 1 of the integrated circuit 25, may comprise a 10M resistor.

Operation

The casing 21 of the device 20 is operatively connected to an appliance with which the device is to be associated—as by mounting tape, screws, or the like—and the probe 22 is inserted into operative association with the volume of the appliance whose temperature is to be monitored. The front cover of the casing 21 is removed and the wheel 43 is rotated to adjust the variable transistor 37 to the desired temperature setting between about zero and about 50° F., and then the cover of the casing 21 is replaced.

If for some reason the probe 22 should become inoperative, the horn 29 will be activated. For instance if the probe 22 becomes damaged, severed from the casing 21 and the components therein, or is pulled out of the protected appliance, the voltage at pin 5 of integrated circuit 25 rises to the reference voltage (e.g. 5.3 volts) set by pin 3. When the voltage gets above approximately 1.2 volts, the Darlington transistor 46 turns "on" and drives the horn oscillator circuit 30.

Should the output of the battery 27 fall below 8.2 volts nominal, a low battery output signal will occur on pin 10 of integrated circuit 25 every 30 seconds (the time constant of capacitor 42) for approximately 30 milliseconds, as long as the voltage on pin 12 is below the low reference battery voltage (8.2) set by integrated circuit 25.

With the probe 22 disposed in the volume to be monitored, as the temperature in the volume increases the voltage at pin 5 of integrated circuit 25 will decrease. When the voltage at pin 5 drops below that at pin 4 set by the reference leg 36–38 of the voltage measurement bridge 33 (that is the temperature within the volume in which probe 22 is disposed falls below the relevant temperature set utilizing wheel 43) the output of the voltage comparator 28 changes states and generates an output signal on pin 10. The output at pin 10 turns on transistor 44, which in turn drives the horn oscillator circuit 30, activating the horn 29.

It will thus be seen that according to the present invention an efficient, effective, and simple mechanism is provided for sensing temperatures that are above a desired level in a refrigerated compartment or the like. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A temperature indicating device comprising:
a battery;
indicator means;
a temperature probe comprising a negative temperature coefficient thermistor;
first circuitry means for detecting the output voltage of said battery, and for generating an output signal when an input comparator thereof detects an abnormal input condition;
second circuitry means for determining whether or not said probe is operatively connected to said first circuitry means and said indicator means; said second circuitry means consisting of an NPN Darlington transistor and a resistor, said Darlington transistor operatively connected to said indicator means by a diode; and
third circuitry means operatively interconnecting said battery, indicator means, and first and second circuitry means for actuating said indicator means should said battery output voltage be below a predetermined value, or should said temperature probe be operatively disconnected, or should the temperature sensed by the temperature probe rise above a predetermined value;
said third circuitry means including, in combination with said probe, adjustable voltage measuring means operatively connected to said input comparator of said first circuitry means for allowing adjustment of the temperature at said probe at which said indicator means is actuated, and for effecting actuation of said indicator means when the temperature at said probe is within about ±3 percent of the adjusted temperature setting, wherein said adjustable voltage measuring means comprises a voltage measurement bridge comprising a variable side including first and second resistors and said thermistor, and a reference side including third and fourth resistors and a variable resistor, wherein each of said resistors of said voltage measurement bridge are accurate to about one percent; and high and low pass filter capacitors operatively connected to said voltage measurement bridge, said high pass filter capacitor being operatively connected to said voltage measurement bridge variable side at a point between said first and second resistors, and connected to said reference side at a point between said third and variable resistors.

2. A device as recited in claim 1 wherein said battery comprises a 9 volt battery, and wherein said first, second, third, fourth, and variable resistors have the following values: first resistor, approximately 3.9M; second resistor, approximately 178K; third resistor, approximately 5.11M; fourth resistor, approximately 267K; and variable resistor, approximately 500K.

3. A device as recited in claim 1 wherein said indicator means comprises a piezo electric horn driven by a horn oscillator circuit including a transistor, said diode operatively connected to said transistor of said horn oscillator circuit.

4. A device as recited in claim 1 wherein said adjustable voltage measuring means is adjustable so that the adjusted relevant temperature setting for the temperature probe is adjustable between about zero–50° F.

5. A device as recited in claim 1 wherein said battery comprises a 9 volt battery, and wherein said first circuitry means senses battery voltage when it falls below 8.2 volts nominal, and activates said indicator means in response thereto.

6. A temperature indicating device comprising:
a battery;
indicator means;
a temperature probe comprising a negative temperature coefficient thermistor;
first circuitry means for detecting the output voltage of said battery, and for generating an output signal when an input comparator thereof detects an abnormal input condition;
second circuitry means for determining whether or not said probe is operatively connected to said first circuitry means and said indicator means; said second circuitry means consisting of an NPN Darlington transistor and a resistor, said Darlington transistor operatively connected to said indicator means by a diode; and
third circuitry means operatively interconnecting said battery, indicator means, and first and second circuitry means for actuating said indicator means should said battery output voltage be below a predetermined value, or should said temperature probe be operatively disconnected, or should the temperature sensed by the temperature probe rise above a predetermined value;
said third circuitry means including, in combination with said probe, adjustable voltage measuring means operatively connected to said input comparator of said first circuitry means for allowing adjustment of the temperature at said probe at which said indicator means is actuated, and for effecting actuation of said indicator means when the temperature at said probe is within about ±3 percent of the adjusted temperature setting;
said adjustable voltage measuring means comprises a voltage measurement bridge comprising a variable side including first and second resistors and said thermistor, and a reference side including third and fourth resistors and a variable resistor;
said first circuitry means comprising an integrated circuit including a reference voltage pin, and wherein said first resistor is operatively connected at one end thereof to said reference voltage pin, and at the other end thereof to said second resistor, and said second resitor is connected at the other end thereof to said probe thermistor, and said probe is operatively connected at the other end thereof to ground; and wherein said third resistor is operatively connected at one end thereof to said reference voltage pin, and at the other end thereof to said variable resistor, and said variable resistor is operatively connected at the other end thereof to said fourth resistor, and said fourth resistor is operatively connected at the other end thereof to ground; and, a high pass filter operatively connected at one end thereof to a conducting line extending between said first and second resistors, and connected at the other end thereof to a conducting line extending between said third resistor and said variable resistor.

7. A device as recited in claim 6 wherein said battery comprises a 9 volt battery, and wherein said first, second, third, fourth, and variable resistors have the following values: first resistor, approximately 3.9M; second resistor, approximately 178K; third resistor, approximately 5.11M; fourth resistor, approximately 267K; and variable resistor, approximately 500K.

8. A device as recited in claim 6 wherein said indicator means comprises a piezo electric horn driven by a horn oscillator circuit including a transistor, said diode operatively connected to said transistor of said horn oscillator circuit.

9. A device as recited in claim 6 wherein said adjustable voltage measuring means is adjustable so that the adjusted relevant temperature setting for the temperature probe is adjustable between about zero–50° F.

10. A device as recited in claim 6 wherein said battery comprises a 9 volt battery, and wherein said first circuitry means senses battery voltage when it falls below 8.2 volts nominal, and activates said indicator means in response thereto.

* * * * *

UNITED STATES PATENT AND TRADEMARK OFFICE
CERTIFICATE OF CORRECTION

PATENT NO. : 4,567,474

DATED : January 28, 1986

INVENTOR(S) : Dale Wolin

It is certified that error appears in the above-identified patent and that said Letters Patent is hereby corrected as shown below:

Column 3, line 54, "transistor" should read -- resistor --.

Column 4, line 10, "falls below" should read -- rises above --.

Signed and Sealed this

Sixth Day of January, 1987

Attest:

DONALD J. QUIGG

*Attesting Officer*     *Commissioner of Patents and Trademarks*